(12) United States Patent
Cook et al.

(10) Patent No.: US 8,344,552 B2
(45) Date of Patent: Jan. 1, 2013

(54) ANTENNAS AND THEIR COUPLING CHARACTERISTICS FOR WIRELESS POWER TRANSFER VIA MAGNETIC COUPLING

(75) Inventors: Nigel P. Cook, El Cajon, CA (US); Hanspeter Widmer, Solothurn (CH); Lukas Sieber, Olten (CH)

(73) Assignee: QUALCOMM Incorporated, San Diego, CA (US)

( * ) Notice: Subject to any disclaimer, the term of this patent is extended or adjusted under 35 U.S.C. 154(b) by 486 days.

(21) Appl. No.: 12/394,033

(22) Filed: Feb. 26, 2009

(65) Prior Publication Data

US 2009/0213028 A1 Aug. 27, 2009

Related U.S. Application Data

(60) Provisional application No. 61/032,061, filed on Feb. 27, 2008.

(51) Int. Cl.
*H01H 27/42* (2006.01)
(52) U.S. Cl. ........................................ 307/104
(58) Field of Classification Search .......... 307/104, 307/149
See application file for complete search history.

(56) References Cited

U.S. PATENT DOCUMENTS

| | | | |
|---|---|---|---|
| 5,889,384 A | 3/1999 | Hayes et al. | |
| 6,483,202 B1 | 11/2002 | Boys | |
| 6,515,878 B1 | 2/2003 | Meins et al. | |
| 7,159,774 B2 | 1/2007 | Woodard et al. | |
| 7,639,514 B2 | 12/2009 | Baarman | |
| 7,741,734 B2 * | 6/2010 | Joannopoulos et al. | 307/104 |
| 7,825,543 B2 | 11/2010 | Karalis et al. | |
| 7,868,482 B2 | 1/2011 | Greene et al. | |
| 7,919,886 B2 | 4/2011 | Tanaka | |
| 2005/0127867 A1 | 6/2005 | Calhoon et al. | 320/108 |
| 2005/0131495 A1 | 6/2005 | Parramon et al. | 607/61 |
| 2007/0222542 A1 | 9/2007 | Joannopoulos | |
| 2007/0228833 A1 | 10/2007 | Stevens et al. | |
| 2007/0285325 A1 | 12/2007 | St. Clair | |
| 2008/0054638 A1 | 3/2008 | Greene et al. | |
| 2008/0067874 A1 | 3/2008 | Tseng | |
| 2008/0191897 A1 | 8/2008 | McCollough | 340/625.22 |
| 2009/0001941 A1 | 1/2009 | Hsu et al. | |
| 2009/0067208 A1 | 3/2009 | Martin et al. | |
| 2009/0108805 A1 | 4/2009 | Liu et al. | |
| 2009/0160261 A1 | 6/2009 | Elo | |
| 2009/0167449 A1 | 7/2009 | Cook et al. | |
| 2009/0243394 A1 | 10/2009 | Levine | |

(Continued)

OTHER PUBLICATIONS

Chunbo et al.,"Research on the topology of wireless energy transfer device", Sch. of Electr. Eng. & Autom., Harbin Inst. of Technol., Harbin This paper appears in: Vehicle Power and Propulsion Conference, 2008. VPPC '08. IEEE Issue Date : Sep. 3-5, 2008 on p. 1 Print ISBN: 978-1-4244-1848-0 INSPEC Accession No. 10394615 Digital Object Identifier : 10.1109/VPPC.2008.4677798 Date of Current Version : Nov. 18, 2008.

(Continued)

*Primary Examiner* — Robert L. DeBeradinis
(74) *Attorney, Agent, or Firm* — Knobbe Martens Olson & Bear, LLP

(57) ABSTRACT

Optimizing a wireless power system by separately optimizing received power and efficiency. Either one or both of received power and/or efficiency can be optimized in a way that maintains the values to maximize transferred power.

62 Claims, 3 Drawing Sheets

U.S. PATENT DOCUMENTS

| | | | |
|---|---|---|---|
| 2009/0284083 | A1 | 11/2009 | Karalis et al. |
| 2009/0284245 | A1 | 11/2009 | Kirby et al. |
| 2009/0302933 | A1 | 12/2009 | Boys et al. |
| 2009/0308933 | A1 | 12/2009 | Osada |
| 2010/0109445 | A1 | 5/2010 | Kurs et al. |
| 2010/0117456 | A1 | 5/2010 | Karalis et al. |
| 2010/0164296 | A1 | 7/2010 | Kurs et al. |
| 2010/0181845 | A1 | 7/2010 | Fiorello et al. |
| 2010/0181961 | A1 | 7/2010 | Novak et al. |
| 2010/0201310 | A1 | 8/2010 | Vorenkamp et al. |
| 2010/0222010 | A1 | 9/2010 | Ozaki et al. |
| 2010/0231053 | A1* | 9/2010 | Karalis et al. ............... 307/104 |
| 2010/0277121 | A1 | 11/2010 | Hall et al. |
| 2010/0289449 | A1 | 11/2010 | Elo |
| 2011/0095618 | A1 | 4/2011 | Schatz et al. |

OTHER PUBLICATIONS

Kim, et al., Switchable polymer-based thin film coils as a power module wireless neural interfaces, Sensors and Actuators, vol. A 136, Issue 1, May 2007 (available online Nov. 27, 2006), pp. 467-474.

Onizuka, et al., A design methodology of chip-to-chip wireless power transmission system, Univ. of Tokyo, International Conference on Integrated Circuit Design and Technology, 2007 (ICICDT '07), IEEE, May-Jun. 2007, pp. 1-4.

Yates et al., "Optimal transmission frequency for ultralow-power short-range radio links", Source: IEEE Transactions on Circuits and Systems I: Fundamental Theory and Applications, v 51, n. 7, 1405-13, Jul. 2004; ISSN: 1057-7122; DOI: 10.1109/TCSI.2004.830696; Publisher: IEEE, USA Author affiliation: Dept. of Electr. & Electron. Eng., Imperial Coll. London, UK.

"Wireless Non-Radiative Energy Transfer", MIT paper, publication and date unknown, believed to be 2007.

"Efficient wireless non-radiative mid-range energy transfer", MITpaper, publication and date unknown, believed to be 2007.

"Wireless Power Transfer via Strongly Coupled Magnetic Resonances", Kurs et al, Science Express, Jun. 7, 2007.

"Wireless Power Transfer via Strongly Coupled Magnetic Resonances", Kurs et al, scimag.org, Jul. 6, 2007.

Schuder J.C., et al., "High-Level Electromagnetic Energy Transfer Through a Closed Chest Wall", Inst.Radio Engrs. Int.Conf Record 9, pp. 119-126, 1961.

* cited by examiner $$Rm = \frac{R0+R1}{2}$$

ANTENNAS AND THEIR COUPLING CHARACTERISTICS FOR WIRELESS POWER TRANSFER VIA MAGNETIC COUPLING

This application claims priority from provisional application No. 61/032,061, filed Feb. 27, 2008, the disclosure of which is herewith incorporated by reference.

BACKGROUND

Our previous applications and provisional applications, including, but not limited to, U.S. patent application Ser. No. 12/018,069, filed Jan. 22, 2008, entitled "Wireless Apparatus and Methods", the disclosure of which is herewith incorporated by reference, describe wireless transfer of power.

The transmit and receiving antennas are preferably resonant antennas, which are substantially resonant, e.g., within 10% of resonance, 15% of resonance, or 20% of resonance. The antenna is preferably of a small size to allow it to fit into a mobile, handheld device where the available space for the antenna may be limited.

An embodiment describes a high efficiency antenna for the specific characteristics and environment for the power being transmitted and received.

Antenna theory suggests that a highly efficient but small antenna will typically have a narrow band of frequencies over which it will be efficient. The special antenna described herein may be particularly useful for this kind of power transfer.

One embodiment uses an efficient power transfer between two antennas by storing energy in the near field of the transmitting antenna, rather than sending the energy into free space in the form of a travelling electromagnetic wave. This embodiment increases the quality factor (Q) of the antennas. This can reduce radiation resistance ($R_r$) and loss resistance ($R_l$)

SUMMARY

The present application describes the way in which the "antennas" or coils interact with one another to couple wirelessly the power therebetween.

DETAILED DESCRIPTION

Figure 1:
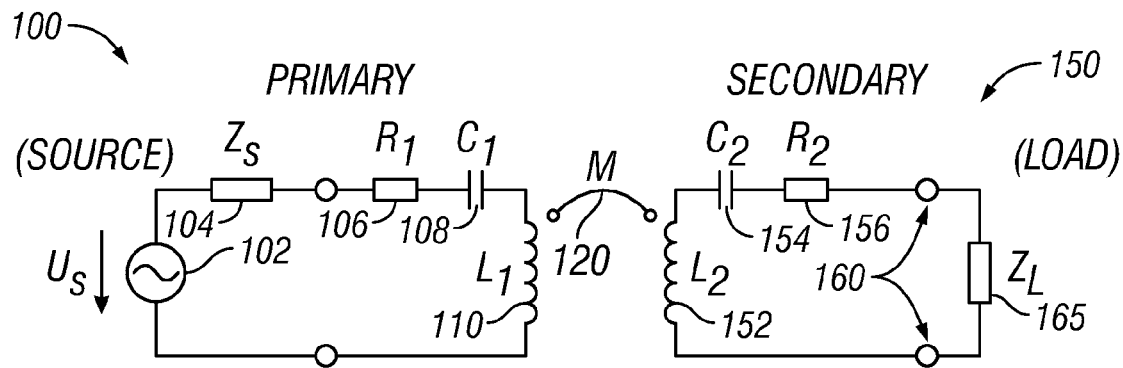
FIG. 1 shows a diagram of a wireless power circuit.

FIG. 1 is a block diagram of an inductively coupled energy transmission system between a source 100, and a load 150. The source includes a power supply 102 with internal impedance $Z_s$ 104, a series resistance $R_4$ 106, a capacitance C1 108 and inductance L1 110. The LC constant of capacitor 108 and inductor 110 causes oscillation at a specified frequency.

The secondary 150 also includes an inductance L2 152 and capacitance C2 154, preferably matched to the capacitance and inductance of the primary. A series resistance R2 156. Output power is produced across terminals 160 and applied to a load ZL 165 to power that load. In this way, the power from the source 102 is coupled to the load 165 through a wireless connection shown as 120. The wireless communication is set by the mutual inductance M.

Figure 2:
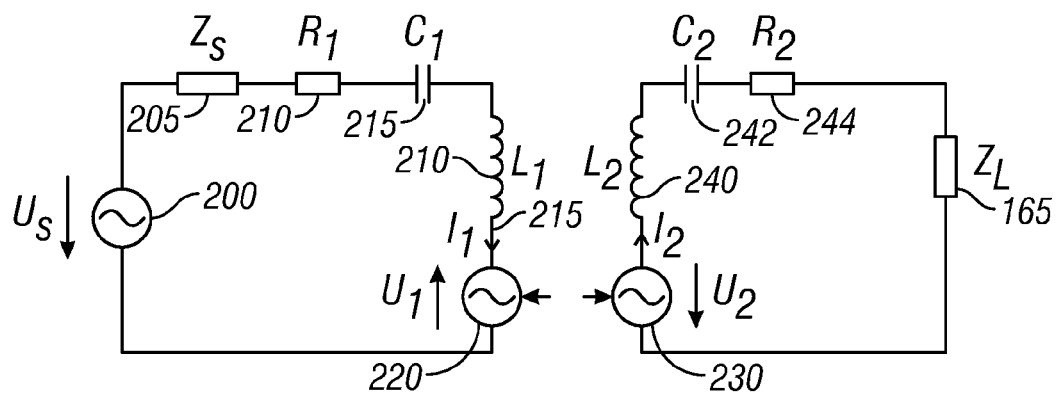
FIG. 2 shows an equivalent circuit.

FIG. 2 shows an equivalent circuit to the transmission system of FIG. 1. The power generator 200 has internal impedance Zs 205, and a series resistance R1 210. Capacitor C1 215 and inductor L1 210 form the LC constant. A current I1 215 flows through the LC combination, which can be visualized as an equivalent source shown as 220, with a value U1.

This source induces into a corresponding equivalent power source 230 in the receiver, to create an induced power U2. The source 230 is in series with inductance L2 240, capacitance C2 242, resistance R2 244, and eventually to the load 165.

Considering these values, the equations for mutual inductance are as follows:

$$U_2 = j\omega M I_1$$

$$U_1 = j\omega M I_2$$

where:

$$z_M = j\omega M$$

$$z_1 = z_s + R_1 + j\left(\omega L_1 - \frac{1}{\omega C_1}\right)$$

$$z_2 = z_L + R_2 + j\left(\omega L_{21} - \frac{1}{\omega C_2}\right)$$

$$z_s = R_s + jX_s$$

$$z_L = R_L + jX_L$$

The Mesh equations are:

$$U_s + U_1 - z_1 I_1 = 0 \rightarrow I_1 = (U_s + U_1)/z_1$$
$$U_2 - z_2 I_2 = 0 \quad I_2 = U_2/z_2$$

$$I_1 = \frac{U_s + z_M I_2}{z_1} \quad I_2 = \frac{z_M I_1}{z_2}$$

$$\rightarrow I_2 = \frac{z_M(U_s + z_M I_2)}{z_1 z_2} = \frac{z_M U_s}{z_1 z_2 - z_M^2}$$

$$\rightarrow I_1 = \frac{z_M}{z_M} \cdot I_2 = \frac{z_2 U_s}{z_1 z_2 - z_M^2}$$

where:
Source power:

$$P_1 = Re\{U_s \cdot I_1^*\} = U_s \cdot Re\{I_1^*\} \text{ for avg}\{U_s\} = 0$$

Power into load:

$$P_2 = I_2 \cdot I_2^* \cdot Re\{z_L\} = |I_2|^2 \cdot Re\{z_L\} = |I_2|^2 \cdot R_L$$

Transfer efficiency:

$$\eta = \frac{P_2}{P_1} = \frac{I_2 \cdot I_2^* R_L}{U_s Re\{I_1^*\}}$$

$$I_2 \cdot I_2^* = \frac{z_M z_M^* U_s^2}{(z_1 z_2 - z_{M2})(z_1^* z_2^* - z_{M2}^*)}$$

$$Re\{I_1^*\} = Re\left\{\frac{z_2^* U_s}{z_1^* z^* - z_{M2}^*}\right\}$$

Overall transfer Efficiency is therefore:

$$\eta = \frac{P_2}{P_1} = \frac{U_s^2 \cdot R_L z_M z_M^*}{(z_1 z_2 - z_M^2)(z_1^* z_2^* - z_{M^2}^*)}$$

Def.: $z' = z_1 z_2 - z_M^2$ $$\to \eta = \frac{P_2}{P_1} = \frac{R_L z_M z_M^*}{z' z^* \text{Re}\left\{\frac{z_2^* z'}{z' z'^*}\right\}} = \frac{R_L z_M z_M^*}{\text{Re}\{z_2^* \cdot z'\}}$$

$$= \frac{R_L z_M z_M^*}{\text{Re}\{z_2^*(z_1 z_2 - z_M^2)\}} = \frac{R_L |z_M|^2}{\text{Re}\{z_1 |z_2|^2 - z_2^* z_M^2\}}$$

$$\to \eta = \frac{P_2}{P_1} = \frac{R_L |z_M|^2}{|z_2|^2 \cdot \text{Re}\{z_1\} - z_M^2 \text{Re}\{z_2^*\}}$$

$\text{Re}\{z_1\} = R_s + R_1$ $\text{Re}\{z_2^*\} = R_L + R_2$ $|z_2|^2 = (R_L + R_2)^2 + \left(\omega L_2 - \frac{1}{\omega C_2} + X_L\right)^2$ $|z_M|^2 = \omega^2 M^2$ $z_{M^2} = (j\omega M)^2 = -\omega^2 M^2$ A Transfer efficiency equation can therefore be expressed as:

$$\eta = \frac{P_2}{P_1} = \frac{\omega^2 M^2 \cdot R_L}{(R_s + R_n)\left[(R_L + R_2)^2 + \left(\omega L_2 - \frac{1}{\omega C_2} + X_L\right)^2\right] + \omega^2 M^2 (R_L + R_2)}$$

Which reduces in special cases as follows:
A) when $\omega = \omega_0 = 1/\sqrt{L_2 C_2}$, $X_L = 0$ or where $$\omega L_2 - \frac{1}{\omega C_2} + X_L(\omega) = 0$$

$$\eta = \frac{P_2}{P_1}$$

$$= \frac{\omega_0^2 M^2}{[(R_s + R_n)(R_L + R_2) + \omega_0^2 M^2]} \cdot \frac{R_L}{(R_L + R_2)}$$

B) when $\omega = \omega_0$, $R_s = 0$:

$$\eta = \frac{P_2}{P_1}$$

$$= \frac{\omega_0^2 M^2 R_L}{R_1 (R_L + R_2)^2 + \omega_0^2 M^2 (R_L + R_2)}$$

C) when $\omega = \omega_0$, $R_s = 0$ $R_L = R_2$:

$$\eta = \frac{P_2}{P_1}$$

$$= \frac{\omega_0^2 M^2}{4R_1 R_2 + 2\omega_0^2 M^2}$$

D) when $\omega = \omega_0$, $R_s = 0$ $R_L = R_2$ $2R_1 R_2 \gg \omega_0^2 M^2$:

$$\eta = \frac{P_2}{P_1} \cong \frac{\omega_0^2 M^2}{4R_1 R_2} \text{(weak coupling)}$$

where:
Mutual inductance:

$M = k\sqrt{L_1 L_2}$ where k is the coupling factor

Loaded Q factors:

$$Q_{1,L} = \frac{\omega L_1}{R_s + R_1}$$

$$Q_{2,L} = \frac{\omega L_2}{R_L + R_2}$$

Therefore, the transfer efficiency in terms of these new definitions:
A) when $\omega = \omega_0$ $$\eta = \frac{P_2}{P_1}$$

$$= \frac{k^2 \cdot \frac{\omega_0 L \cdot \omega_0 L_2}{(R_s + R_1)(R_L + R_2)}}{1 + k^2 \cdot \frac{\omega_0 L \cdot \omega_0 L_2}{(R_s + R_1)(R_L + R_2)}} \cdot \frac{R_L}{R_L + R_2}$$

$$\eta = \frac{k^2 \cdot Q_{1,L} \cdot Q_{2,L}}{1 + k^2 \cdot Q_{1,L} \cdot Q_{2,L}} \cdot \frac{R_L}{R_L + R_2}$$

C) when $\omega = \omega_0$, $R_L = R_2$, ($R_s = 0$):

$$\eta = \frac{k^2 \cdot Q_{1,L} \cdot Q_{2,L}}{2(1 + k^2 \cdot Q_{1,L} Q_{2,L})} = \frac{k^2 \cdot Q_{1,UL} \cdot Q_{2,UL}}{4(1 + k^2 \cdot Q_{1,UL} Q_{2,UL}/2)} \quad \nearrow = 2Q_{2,L}$$

D) $\omega = \omega_0$, $R_L = R_2$, ($R_s = 0$), $2R_n R_2 \gg \omega_0^2 M^2 \to 1 \gg k^2 Q_{1,UL} Q_{2,UL}/2$ $$\eta = \frac{P_2}{P_n} \cong \frac{k^2 Q_{1,UL} Q_{2,UL}}{4} \text{(weak coupling)}$$

$Q_{UL}$: Q unloaded $$Q_{1,UL} = \frac{\omega L_1}{R_1};$$

$$Q_{2,UL} = \frac{\omega L_2}{R_2}$$

This shows that the output power is a function of input voltage squared $$P_2 = f(U_s^2) + I_2 \cdot I_2^* R_L;$$

$$I_2 = \frac{z_M U_s}{z_1 z_2 - z_{M^2}}$$

$$P_2 = \frac{z_M z_M^* R_L}{(z_1 z_2 - z_M^2)(z_1^* z_2^* - z_M^{2*})} \cdot U_s^2$$

-continued $$P_2 = \frac{|z_M|^2 \cdot R_L \cdot U_s^2}{z_1 z_2 z_1^* z_2^* + |z_M| + |z_M|^2 \cdot (z_1 z_2 + z_1^* z_2^*)}$$

$$P_2 = \frac{|z_M|^2 \cdot R_L \cdot U_s^2}{|z_1 z_2|^2 + |z_M|^2 2\text{Re}\{z_1 z_2\} + |z_M|^4}$$

$$z_M = j\omega M$$

$$z_M^* = -j\omega M$$

$$|z_M| = \omega M = z_M z_M^*$$

$$z_M^{*2} = -\omega^2 M^2 = -|z_M|^2$$

$$z_M^{2*} = -\omega^2 M^2 = z_M^2 = -|z_M|^2$$

$$z_M^2 \cdot z_M^{2*} = |z_M|^4$$

$$|z_1 z_2| = |z_1| \cdot |z_2|$$

$$z_1 z_2 + z_1^* z_2^* = 2\text{Re}\{z_1 z_2\}$$

$$|z_1 \cdot z_2|^2 = |z_1|^2 \cdot |z_2|^2$$

DEFINITIONS $$z_1 R'_1 + jX_1; z_2 = R'_2 + jX_2$$

$$|z_1 z_2|^2 = (R'^2_1 + X_1^2)(R'^2_2 + X_2^2) = R'^2_1 R'^2_2 + X_1^2 R'^2_2 + X_2^2 R'^2_1 + X_1^2 X_2^2$$

$$\text{Re}\{z_1 z_2\} = \text{Re}(R'_1 + jX_1)(R'_2 + jX_2) = R'_1 R'_2 + X_1 X_2$$

$$|z_M| = X_M$$

$$P_2 = \frac{X_M^2 R_1 \cdot U_s^2}{R'^2_1 R'^2_2 + R'^2_1 X_2^2 + R'^2_2 X_1^2 + X_1^2 X_2^2 + 2X_M^2 R'_1 R'_2 + 2X_M^2 X_1 X_2 + X_M^4}$$

$$P_2 = \frac{X_M^2 R_L \cdot U_s^2}{(R'_1 R'_2 + X_M^2)^2 + R'^2_1 X_2^2 + R'^2_2 X_1^2 + X_1^2 X_2^2 + 2X_M^2 X_1 X_2}$$

Therefore, when at or near the resonance condition:

$$\omega = \omega_0 = \omega_2 = \omega_0 \rightarrow X_1 = 0, X_2 = 0$$

$$P_2 = \frac{X_M^2 R_1 \cdot U_s^2}{R'^2_1 R'^2_2 + 2X_M^2 R'_1 R'_2 + X_M^4}$$

$$= \frac{X_M^2 R_L}{(R'_1 R'_2 + X_M^2)^2} \cdot U_s^2$$

$$P_2 = \frac{\omega_0^2 M^2 R_L}{(R_s + R_1)^2 (R_1 + R_2)^2 + 2\omega_0^2 M^2 (R_s + R_1)(R_L + R_2) + \omega_0^4 M^4} \cdot U_s^2$$

$$P_2 = \frac{\omega_0^2 M^2 R_L}{((R_s + R_1)(R_1 + R_2) + \omega_0^2 M^2)^2} U_s^2$$

Showing that the power transfer is inversely proportional to several variables, including series resistances.

Mutual inductance in terms of coupling factors and inductions:

$$M = k \cdot \sqrt{L_1 L_2}$$

$$P_2 = \frac{\omega_0^2 k^2 L_1 L_2 \cdot R_L}{((R_s + R_1)(R_1 + R_2) + \omega_0^2 k^2 L_1 L_2)^2} \cdot U_s^2$$

$$= \frac{k^2 \frac{\omega_0 L_1 \omega_0 L_2}{(R_s + R_M)(R_1 + R_2)}}{\left(1 + k^2 \frac{\omega_0 L_1 \omega_0 L_2}{(R_s + R_M)(R_1 + R_2)}\right)^2} \cdot \frac{U_s^2 R_L}{(R_s + R_1)(R_L + R_2)}$$

$$P_2 = \frac{k^2 \cdot Q_{L1} \cdot Q_{L2}}{(1 + k^2 \cdot Q_{L1} \cdot Q_{L2})^2} \cdot \frac{R_L}{(R_s + R_1)(R_L + R_2)} \cdot U_s^2$$

The power output is proportional to the square of the input power, as described above. However, there is a maximum input power beyond which no further output power will be produced. These values are explained below. The maximum input power $P_{1,max}$ is expressed as:

$$P_{1,max} = \frac{U_s^2}{R_s + R_{in,min}} = \text{Re}\{U_s \cdot I_1^*\};$$

$R_{in,min}$: min. permissible input resistance

Efficiency relative to maximum input power:

$$\eta' = \frac{P_2}{P_{1,max}}$$

$$= \frac{P_2(U_s^2)}{P_{1,max}}$$

Under resonance condition $\omega = \omega_1 = \omega_2 = \omega_0$:

$$\eta' = \frac{\omega_0^2 M^2 R_L (R_s + R_{in,min})}{[(R_s + R_1)(R_1 + R_2) + \omega_0^2 M^2]^2}$$

Equation for input power ($P_1$) under the resonance condition is therefore:

$$P_1 = \frac{P_2}{\eta} = \frac{\omega_0^2 M^2 R_L [(R_s + R_1)(R_1 + R_2) + \omega_0^2 M^2](R_L + R_2)}{[(R_s + R_2)(R_L + R_2) + \omega_0^0 M^2]^2 \cdot \omega_0^2 M^2 R_L} \cdot U_s^2$$

$$P_1 = \frac{R_L + R_2}{(R_s + R_1)(R_L + R_2) + \omega_0^2 M^2} \cdot U_s^2$$

For $(R_s + R_M)(R_L + R_2) >> \omega_0^2 M^2$:

$$P_1 \cong \frac{U_s^2}{(R_s + R_1)}$$

The current ratio between input and induced currents can be expressed as $$\frac{I_2}{I_1} = \frac{z_M \cdot U_s \cdot (z_1 z_2 - z_m^2)}{(z_1 z_2 - z_M^2) z_2 U_s} = \frac{z_M}{z_2} = \frac{j\omega M}{R_L + R_2 + j\left(\omega L_2 - \frac{1}{\omega C_2}\right)}$$

at $\omega = \omega_0 = \frac{1}{\sqrt{L_2 C_2}}$

-continued $$\frac{I_2}{I_1} = \frac{j\omega M}{R_1 + R_2} \quad \text{avg}\left\{\frac{I_2}{I_1}\right\} = \frac{\pi}{2}$$

Weak coupling: $R_1+R_2 > |\omega M| \rightarrow I_2 < I_1$
Strong coupling: $R_1+R_2 < |j\omega M| \rightarrow I_2 >> I_1$
Input current $I_1$: (under resonance condition)

$$I_1 = \frac{P_1}{U_s} = \frac{(R_1 + R_2) \cdot U_s}{(R_s + R_1)(R_L + R_2) + \omega_0^2 M^2}$$

$$I_1 = \frac{(R_L + R_2)}{(R_s + R_1)(R_L + R_2) + \omega_0^2 M^2} \cdot U_s$$

Output current $I_2$: (under resonance condition)

$$I_2 = \frac{j\omega M}{(R_s + R_1)(R_L + R_2) + \omega_0^2 M^2} \cdot U_s$$

Maximizing transfer efficiency and output power ($P_2$) can be calculated according to the transfer efficiency equation:

$$\eta = \frac{P_2}{P_1} = \frac{\omega^2 M^2 R_L}{(R_s + R_n)\left[(R_L + R_2)^2 + \left(\omega L_2 - \frac{1}{\omega C_2} + X_L\right)^2\right] + \omega^2 M^2 (R_L + R_2)}$$

After reviewing this equation, an embodiment forms circuits that are based on observations about the nature of how to maximize efficiency in such a system.

Conclusion 1)
$\eta(L_2, C_2, X_L)$ reaches maximum for $$\omega L_2 - \frac{1}{\omega C_2} + X_L = 0$$

That is, efficiency for any L, C, X at the receiver is maximum when that equation is met. Transfer efficiency wide resonance condition:

$$\eta = \frac{P_2}{P_1}\bigg|_{\omega=\omega_0} = \frac{\omega_0^2 M^2}{[(R_s + R_n)(R_L + R_2) + \omega_0^2 M^2]} \cdot \frac{R_1}{(R_L + R_2)}$$

Conclusion 2)
To maximize $\eta$ $R_s$ should be $R_s \ll R_1$
That is, for maximum efficiency, the source resistance $R_s$ needs to be much lower than the series resistance, e.g., 1/50, or 1/100th or less
Transfer efficiency under resonance and weak coupling condition:

$$(R_s + R_n)(R_L + R_2) \gg \omega_0^2 M^2$$

$$\eta \cong \frac{\omega_0^2 M^2 \cdot R_L}{(R_s + R_n)(R_L + R_2)^2}$$

Maximizing $\eta/(R_L)$:

$$\frac{d\eta}{dR_L} = \frac{\omega_0^2 M^2}{R_s + R_1} \cdot \frac{(R_L + R_2) - 2R_L}{(R_L + R_2)^3} = 0 \rightarrow R_L = R_2$$

Conclusion 3)
$\eta$ reaches maximum for $R_L = R_2$ under weak coupling condition.
That is, when there is weak coupling, efficiency is maximum when the resistance of the load matches the series resistance of the receiver.
Transfer efficiency under resonance condition.
Optimizing $R_L$ to achieve max. $\eta$ $$\frac{d\eta}{dR_L} = 0; \quad \frac{d}{dR_L} \cdot \frac{\omega_0^2 M^2 R_L}{\underbrace{(R_s + R_1)(R_L + R_2)^2 + \omega_0^2 M^2 (R_L + R_2)}_{R_1}} \frac{u}{v}$$

$$\frac{u \cdot v' - v \cdot u'}{v^2} = 0$$

$$u \cdot v' - v \cdot u' = 0$$

$$u = \omega_0^2 M^2 \cdot R_L; \quad u' = \omega_0^2 M^2$$

$$v = R_1'(R_L + R_2)^2 + \omega_0^2 M^2 (R_1 + R_2)$$

$$v' = 2R_1'(R_L + R_2) + \omega_0^2 M^2$$

$$u \cdot v' - v \cdot u' = \omega_0^2 M^2 R_L (2R_1'(R_L + R_2) + \omega_0^2 M^2) -$$
$$(R_1'(R_1 + R_2)^2 + \omega_0^2 M^2 (R_L + R_2))\omega_0^2 M^2$$
$$= 0$$
$$= 2R_1' R_L (R_L + R_2) + \omega_0^2 M^2 R_L -$$
$$R_1'(R_L + R_2)^2 - \omega_0^2 M^2 (R_L + R_2)$$
$$= 0$$
$$= 2R_1' R_L^2 + 2R_1' R_2 R_L + \omega_0^2 M^2 R_L -$$
$$R_1' R_L^2 + 2R_1' R_2 R_L - R_1' R_2^2 - \omega_0^2 M^2 R_L - \omega_0^2 M^2 R_2$$
$$= 0$$
$$= (1R_1' - R_1') R_L^2 - R_1' R_2^2 - \omega_0^2 M^2 R_2$$
$$= 0$$

$$R_L^2 = \frac{R_1' R_2^2 + \omega_0^2 M^2 R_2}{R_1'}$$

$$R_L = \pm \sqrt{\frac{(R_s + R_1) R_2^2 + \omega_0^2 M^2 R^2}{(R_s + R_1)}}$$

$$= \pm R_2 \cdot \sqrt{\frac{(R_s + R_1) + \omega_0^2 M^2 / R^2}{(R_s + R_1)}}$$

$$R_{L,opt} = R_2 \sqrt{1 + \frac{\omega_0^2 M^2}{(R_s + R_1) R_2}}$$

Weak coupling condition $\omega_0^2 M^2 \ll (R_s + R_1) R_2$ $$R_{L,opt} \cong R_2$$

Conclusion 4)
There exists an optimum $R_L > R_2$ maximizing $\eta$
Output power $P_2$:

$$P_2 = \frac{X_M^2 R_1 U_s^w}{(R_1' R_2' + X_M^2)^2 + R_1'^2 X_2^2 + R_2'^2 X_1^2 + X_1^2 X_2^2 + 2X_M^2 X_2 X_2}$$

Conclusion 5)
Output power $P_2(X_1, X_2)$ reaches maximum for $$X_1 = \omega L_1 - \frac{1}{\omega C_1} + X_s = 0$$

$$X_2 = \omega L_2 - \frac{1}{\omega C_2} + X_L = 0$$

that is, when there is a resonance condition at both the primary and the secondary.
Output power $P_2$ wide resonance condition:

$$P_2 = \frac{\omega_0^2 M^2 \cdot R_L}{[(P_s + R_1)(R_1 + R_2) + \omega_0^2 M^2]^2} \cdot U_s^2$$

Conclusion 6)
To maximize $P_2, R_s$ should be $R_s \ll R_1$
Output power $P_2$ for the wide resonance and weak coupling condition:

$$(R_s + R_1)(R_L + R_2) \gg \omega_0^2 M^2$$

$$P_2 \cong \frac{\omega_0^2 M^2 R_L}{(R_s + R_1)^2 + (R_L + R_2)^1} \cdot U_s^2$$

Conclusion 7)
$P_2(R_L)$ reaches maximum for $R_L = R_2$ (see conclusion 3)
For each of the above, the $\gg$ or $\ll$ can represent much greater, much less, e.g., 20× or 1/20 or less, or 50× or 1/50$^{th}$ or less or 100× or 1/100$^{th}$ or less.
The value $R_L$ can also be optimized to maximize $P_2$:

$$\frac{dP_2}{dR_L} = 0$$

$$\frac{u \cdot v' - v \cdot u'}{v^2} = 0$$

$$u = \omega_0^2 M^2 R_L; u' = \omega_0^2 M^2$$

$$v = [(R_1')(R_L + R_2) + \omega_0^2 M^2]^2$$

$$v' = 2 \cdot [R_1'(R_L + R_2) + \omega_0^2 M^2] \cdot R_1'$$

$$\omega_0^2 M^2 \cdot R_L \cdot 2[R_1'(R_1 + R_2) + \omega_0^2 M^2] R_1 -$$

$$[R_1'(R_L + R_2) + \omega_0^2 M^2]^2 \cdot \omega_0^2 M^2 = 0$$

$$2R_L(R_1'^2 R_L + R_1'^2 R_2) + 1 R_L \omega_0^2 M^2 \cdot R_1' - [R_1' R_L + R_1' R_2 + \omega_0^2 M^2]^2 = 0$$

$$2R_1'^2 R_L^2 + 2R_1'^2 R_2 R_L + 2\omega_0^2 M^2 R_1' R_L - R_1'^2 R_L^2 - R_1'^2 R_2^2 - \omega_0^2 M^4$$

$$- 2R_1'^2 R_2 R_L - 2R_1' \omega_0^2 M^2 R_L - 2R_1' R_2 \omega_0^2 M^2 = 0$$

$$= (2R_1'^2 - R_1'^2) R_L^2 - R_1'^2 R_2^2 - 2R_1' R_2 \omega_0^2 M^2 - \omega_0^2 M^4 = 0$$

$$= R_1'^2 \cdot R_L^2 - (R_1' R_2 + \omega_0^2 M^2)^2 = 0$$

$$R_L^2 = \frac{(R_1' R_2 + \omega_0^2 M^2)^2}{R_1'^2}$$

$$R_{L,opt} = \frac{R_1' R_2 + \omega_0^2 M^2}{R_1'}$$

$$= R_2 \left(1 + \frac{\omega_0^2 M^2}{(R_s + R_1) R_2}\right)$$

$$R_{L,opt} = R_2 \cdot \left(1 + \frac{\omega_0^2 M^2}{(R_s + R_1) R_2}\right)$$

Weak coupling $R_{L,opt} \underset{>}{\cong} R_2$

Conclusion 8)
There exists an optimum $R_L > R_2$ maximizing $P_2$. This $R_{1opt}$ differs from the $R_{1,opt}$ maximizing $\eta$.
One embodiment operates by optimizing one or more of these values, to form an optimum value.

Figure 3:
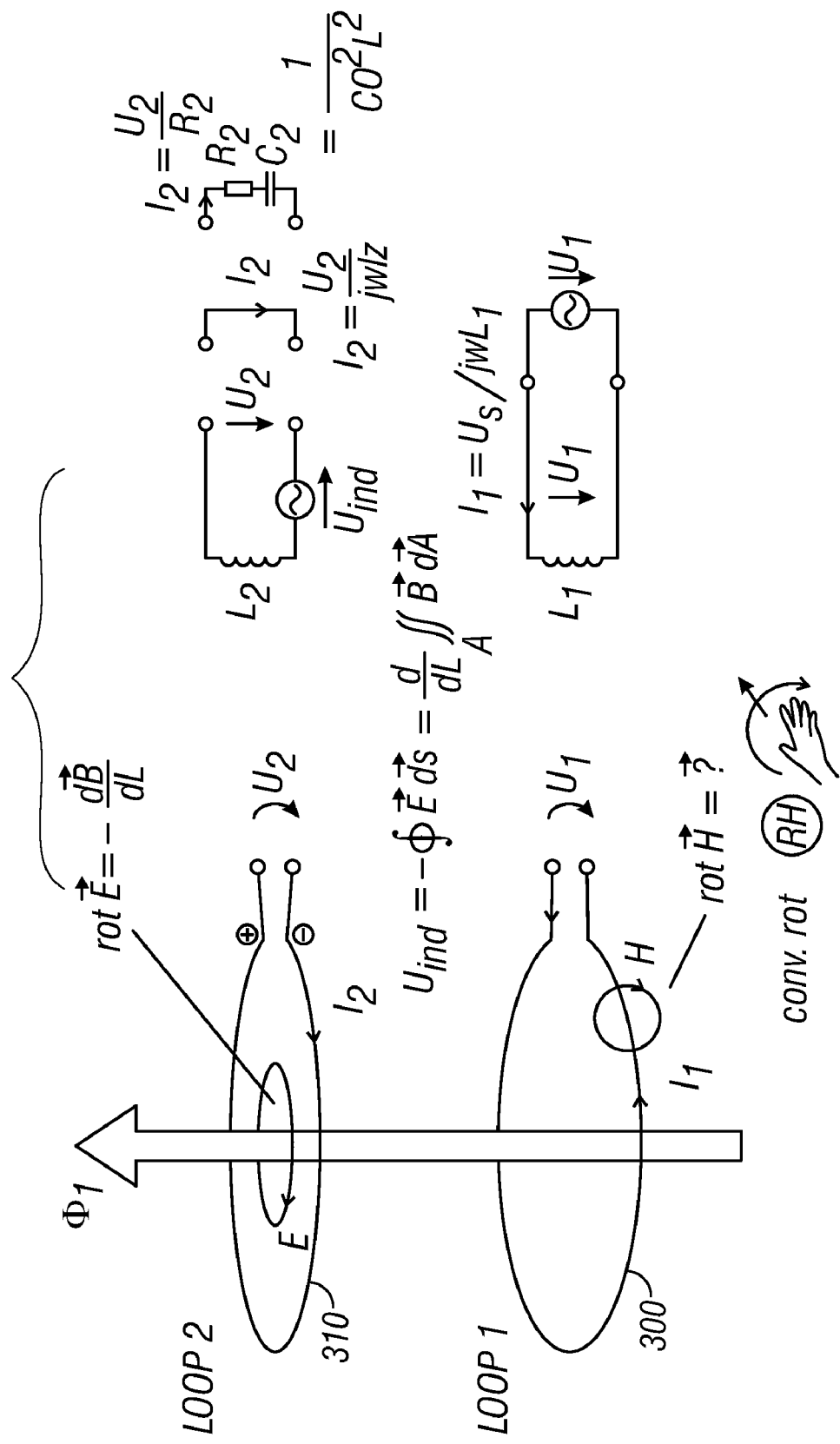
FIG. 3 shows a diagram of inductive coupling.
Figure 4:
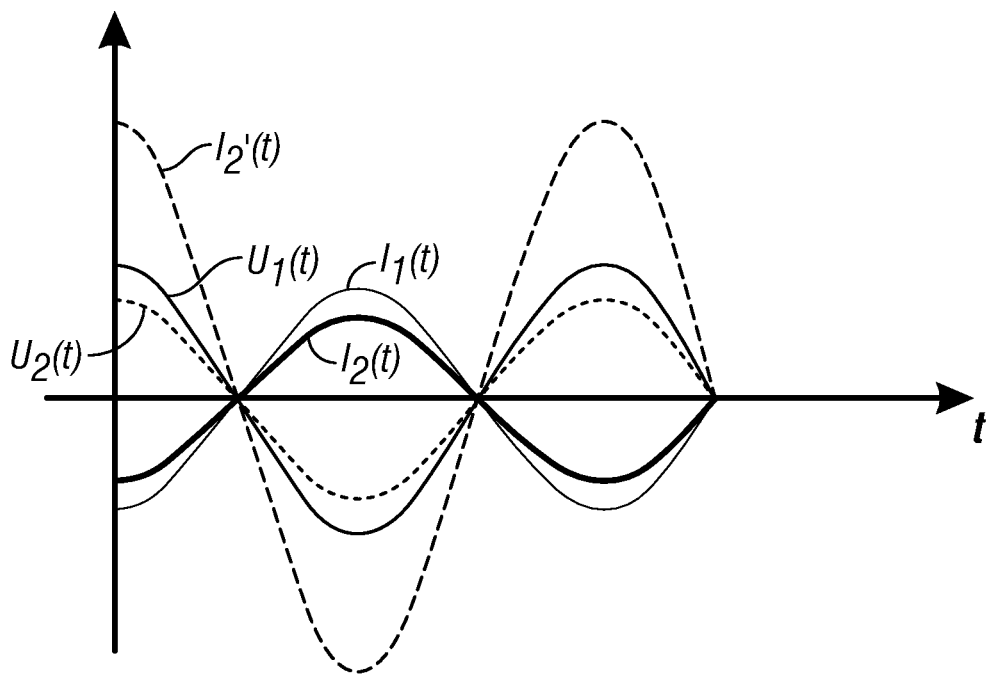
FIG. 4 shows a plot of the inductive coupling.
Figure 5:
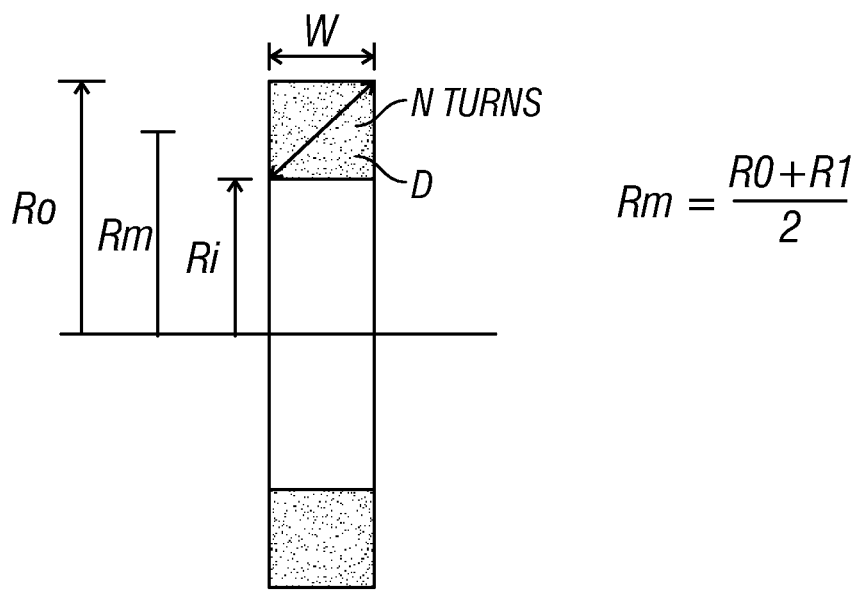
FIG. 5 shows geometry of an inductive coil.

Inductive coupling is shown with reference to FIGS. 3, 4
FIG. 5 illustrates the Inductance of a multi-turn circular loop coil $$R_m = \frac{R_0 + R_1}{2}$$

| Wheeler formula (empirical) $L = \frac{0.8 R_m^2 \cdot N^2}{6R_m + 9w + 10((R_o - R_1)}$ | [Wheeler, H. A., "*Simple inductance formulas for radio coils*". Proc. IRE Vol 16, pp. 1328-1400, October 1928.] |
|---|---|
| Note: this i accurate if all three terms in denominator are about equal. Conversion to H, m units: $L = \frac{0.8 \cdot R_m^2 \cdot \wp^2 \cdot N^1 \cdot 10^{-6}}{6R_m \cdot \wp + 9 \cdot w \cdot \wp + 10(R_0 - R_1)\wp}$ $L = \frac{0.8 \cdot R_m^2 \cdot \wp^2 \cdot N^2 \cdot 10^{-6}}{6R_m + 9w + 10(R_0 - R_1)}$ | [L]µH [$R_m, R_i, R_0, \omega$] = inch $1 \text{ m} = \frac{\frac{\wp}{1000}}{-154} \cdot \text{inch}$ $1H = 10^6 \text{ µH}$ [L] = H [$R_m R_0 R_1 \omega$] = m |

In standard form:

$$L = \frac{\mu_0 \cdot A_m \cdot N^2}{K_c};$$

$$A_m = \pi \cdot R_m^2$$

$$\mu_0 = 4\pi \cdot 10^{-7}$$

$$L = \frac{0.8 \cdot \wp \cdot 10^{-6} \cdot \overline{\pi R_m^2} \cdot N^2 \cdot \overline{4\pi \cdot 10^{-7}}}{\pi \cdot 4\pi \cdot 10^{-7} (6R_m + 9w + 10(R_0 - R_1))}$$

$$L = \frac{\mu_0 A_m \cdot N^2 \cdot 0.8 \wp 10^{-6} \cdot 10}{4\pi^2 \cdot 10^{-7} (6R_m + 9w + 10(R_0 - R_1))} \cdot \frac{1}{K_c}$$

$$R_m = \sqrt{\frac{A_m}{\pi}}$$

$$K_c = \frac{\pi^2 \cdot 25.4 \left(6 \sqrt{\frac{A_m}{\pi}} + 9w + 10(R_0 - R_1)\right)}{2 \cdot 1000}$$

$$K_c \cong \frac{1}{8} \cdot \left(6 \sqrt{\frac{A_m}{\pi}} + 9w + 10(R_0 - R_1)\right)$$

$$L = \frac{\mu_0 A_m N^2}{K_c};$$

$$A_m = \left(\frac{(R_0 + R_1)}{2}\right)^2 \cdot \pi$$

$$[L] = H$$

The inductance of a single-turn circular loop is given as:

$$K_c = \frac{R_m \cdot \pi}{\wp\left[\frac{8R_m}{6} - 2\right]}$$

$$L = \frac{\mu_0 A_m}{K_c}; A_m = R_m^2 \cdot \pi$$

$$[L] = H$$

where:

$R_m$: mean radius in m
b: wire radius in m,
For a Numerical example:
$R_1 = 0.13$ m
$R_0 = 0.14$ m
$\omega = 0.01$ m
$N = 36$
$\rightarrow L = 0.746$ mH
The measured inductance $$L_{meas} = 0.085 \text{ mH}$$

The model fraction of Wheeler formula for inductors of similar geometry, e.g, with similar radius and width ratios is:

$$K_c = \frac{1}{8}\left(5\sqrt{\frac{A_m}{\pi}} + 9w + 10(R_0 - R_1)\right)$$

$$D = \sqrt{W^2 + (R_0 - R_1)^2}$$

$$R_m = \frac{R_0 + R_1}{2}$$

Using a known formula from Goddam, V. R., which is valid for $$w > (R_0 - R_1)$$

$$L = 0.03193 \cdot R_m \cdot N^2 \left[2.303\left(1 + \frac{w^2}{32R_m^2} + \frac{D^2}{96R_m^2}\right)\log\left(\frac{8R_m}{D}\right) - \wp + \frac{w_{1/2}^2}{16R_m^2}\right]$$

1w H,m units:

$$L = \mu_0 R_m \cdot N^2 \left[\left(1 + \frac{w^2}{32R_m^2} + \frac{D^2}{96R_m^2}\right)\ell n\left(\frac{8R_m}{D}\right) - \wp + \frac{w^2 y_2}{16R_m^2}\right]$$

Example 1

| | | |
|---|---|---|
| $R_1 = 0.13$ m | Ratio: $\frac{W}{R_0 - R_1} = 1$ | From [Terman, F.] |
| $R_0 = 0.14$ m | | |
| $W = 0.01$ m | | |
| $N = 36$ | $\rightarrow y_1 = 0.8483$ | |
| $L = 757$ μH | $y_2 = 0.816$ | |

Example 2

Given in [Goddam, V. R.]

| | | | |
|---|---|---|---|
| $R_0 = 8.175$ inches | $y_1 = 0.6310$ | | |
| $R_1 = 7.875$ inches | $y_2 = 0.142$ | Ratio: | $\frac{2}{R_0 - R_1} = \frac{2}{0.3} = 6.667$ or |
| $W = 2$ inches | $\rightarrow L = 2.5$ mH | | |
| $N = 57$ | (2.36 mH) | | $\frac{R_0 - R_1}{W} = \frac{0.3}{2} = 0.15$ | where Goddam, V. R. is the Thesis Masters Louisiana State University, 2005, and Terman, F. is the Radio Engineers Handbook, McGraw Hill, 1943.

Any of these values can be used to optimize wireless power transfer between a source and receiver.

From the above, it can be seen that there are really two different features to consider and optimize in wireless transfer circuits. A first feature relates to the way in which efficiency of power transfer is optimized. A second feature relates to maximizing the received amount of power—independent of the efficiency.

One embodiment, determines both maximum efficiency, and maximum received power, and determines which one to use, and/or how to balance between the two.

In one embodiment, rules are set. For example, the rules may specify:

Rule 1—Maximize efficiency, unless power transfer will be less than 1 watt. If so, increase power transfer at cost of less efficiency.

Rule 2—Maximize power transfer, unless efficiency becomes less than 30%.

Any of these rules may be used as design rules, or as rules to vary parameters of the circuit during its operation. In one embodiment, the circuit values are adaptively changes based on operational parameters. This may use variable components, such as variable resistors, capacitors, inductors, and/or FPGAs for variation in circuit values.

Although only a few embodiments have been disclosed in detail above, other embodiments are possible and the inventors intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, other sizes, materials and connections can be used. Other structures can be used to receive the magnetic field. In general, an electric field can be used in place of the magnetic field, as the primary coupling mechanism. Other kinds of antennas can be used. Also, the inventors intend that only those claims which use the-words "means for" are intended to be interpreted under 35 USC 112, sixth paragraph. Moreover, no limitations from the specification are intended to be read into any claims, unless those limitations are expressly included in the claims.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

What is claimed is:

1. A method for power transfer in a wireless power system, comprising:
    first optimizing efficiency of power transfer between a transmitter and a receiver of wireless power using a variable circuit component; and
    separate from said first optimizing efficiency, second optimizing a received power in said receiver.

2. The method as in claim 1, wherein said first optimizing and said second optimizing are done according to rules that specify information about at least one of an efficiency level or an amount of received power.

3. The method as in claim 2, wherein said information comprises information about a threshold efficiency for power transfer.

4. The method as in claim 2, wherein said information comprises information about a threshold power amount.

5. The method as in claim 1, wherein said first optimizing or said second optimizing comprises optimizing based on at least one of comprising a first resonant frequency of the transmitter with a second resonant frequency of the receiver or based on a strength of a coupling between said transmitter and said receiver.

6. The method as in claim 5, wherein said first optimizing or said second optimizing is performed differently when the transmitter is weakly coupled with the receiver as compared to when the transmitter is strongly coupled with the receiver.

7. The method as in claim 5, further comprising maintaining the first resonant frequency of the transmitter substantially equal to the second resonant frequency of the receiver.

8. The method as in claim 5, wherein said first optimizing or said second optimizing further comprises maintaining a resistance of an inductor in the receiver substantially equal to a series resistance.

9. The method as in claim 5, wherein said first optimizing or said second optimizing further comprises maintaining a source resistance at a transmitter less than a series resistance of the transmitter.

10. The method as in claim 1, wherein first optimizing efficiency comprises maximizing efficiency, provided that the received power is greater than or equal to a threshold power amount.

11. The method as in claim 1, wherein second optimizing received power comprises maximizing the received power, provided that the efficiency of the power transfer is greater than or equal to a threshold efficiency.

12. A wireless power receiver system, comprising:
    an inductor having an inductance value;
    a capacitor electrically connected to the inductor and having a capacitance value; and
    terminal connections applied to a load, wherein the inductance value and the capacitance value are optimized according to a first optimization of receive power efficiency of power received from a wireless power transmitter, or a second optimization of an amount of the received power.

13. The system as in claim 12, wherein said first optimization and second optimization are done according to rules that specify information about at least one of an efficiency level or the amount of received power.

14. The system as in claim 13, wherein said information comprises information about a threshold efficiency for power transfer.

15. The system as in claim 13, wherein said information comprises information about a threshold power amount.

16. The system as in claim 12, further comprising an optimizing circuit configured to perform said first optimization or said second optimization comprises optimizing based on at least one of comparing a first resonant frequency of the wireless power transmitter with a second resonant frequency of a receive circuit including the inductor electrically connected to the capacitor or based on a strength of a coupling with the wireless power transmitter.

17. The system as in claim 16, wherein the optimizing circuit is configured to perform said first optimizing or said second optimization is differently when the wireless power transmitter is weakly couple with the receive circuit as compared to when the wireless power transmitter is strongly coupled with the receive circuit.

18. The system as in claim 16, wherein the optimizing circuit is configured to maintain the first resonant frequency of the wireless power transmitter substantially equal to the second resonant frequency of the receive circuit.

19. The system as in claim 16, wherein the optimizing circuit is configured to maintain an impedance of the inductor substantially equal to a series resistance.

20. The system as in claim 16, wherein the optimization circuit is further configured to maintain a source resistance at the wireless power transmitter as less than a series resistance of the wireless power transmitter.

21. The system as in claim 16, wherein the optimizing circuit comprises at least one of a first component configured to vary the inductance value of the inductor, a second component configured to vary the capacitance value of the capacitor, a variable resistor, or an FPGA.

22. The system as in claim 12, wherein the second optimization of an amount of received power comprises maximizing received power, provided that the receive power efficiency is greater than or equal to a threshold efficiency.

23. The system as in claim 12, wherein the first optimization of receive power efficiency comprises maximizing the receive power efficiency, provided that the amount of the received power is greater than or equal to a threshold power amount.

24. A method of transferring wireless power, comprising:
    optimizing efficiency of power transfer from a transmitter to a receiver of wireless power using a variable circuit component according to rules that specify separately, information about both an efficiency level and an amount of power received by the receiver.

25. The method as in claim 24, wherein said information comprises information about a threshold efficiency for power transfer.

26. The method as in claim 24, wherein said information comprises information about a threshold power amount.

27. The method as in claim 24, wherein said optimizing further comprises maintaining a resistance of an inductor in the receiver substantially equal to a series resistance.

28. The method as in claim 24, wherein said optimizing further comprises maintaining a source resistance at a transmitter as less than a series resistance of the transmitter.

29. The method as in claim 24, wherein optimizing efficiency comprises maximizing efficiency, provided that the amount of power received is greater than or equal to a threshold power amount.

30. A wireless power transmitter system, comprising:
    an inductor having an inductance value;
    a capacitor electrically connected to the inductor and having a capacitance value; and
    terminal connections applied to a load wherein the inductance value and the capacitance value are optimized according to a first optimization of power transfer efficiency of power transmitted to a wireless power receiver a second optimization of an amount of power transmitted.

31. The system as in claim 30, wherein said first optimization and said second optimization are done according to rules that specify information about at least one of an efficiency level or the amount of transmitted power.

32. The system as in claim 31, wherein said information comprises information about a threshold efficiency for power transfer.

33. The system as in claim 31, wherein said information comprises information about a threshold power transmission amount.

34. The system as in claim 30, further comprising an optimizing circuit configured to perform said first optimization or said second optimization comprises optimizing based on at least one of comparing a first resonant frequency of a transmit circuit including the inductor and the capacitor with a second resonant frequency of the wireless power receiver, or based on a strength of a coupling with the wireless power receiver.

35. The system as in claim 34, wherein the optimizing circuit is configured to perform said first optimization or said second optimization is differently when the transmit circuit is weakly coupled with the wireless power receiver as compared to when the transmit circuit is strongly coupled with the wireless power receiver.

36. The system as in claim 34, wherein the optimizing circuit is configured to maintain the first resonant frequency of the transmit circuit substantially equal to the second resonant frequency of the wireless power receiver.

37. The system as in claim 34, wherein the optimizing circuit is configured to maintain an impedance of the inductor substantially equal to a series resistance.

38. The system as in claim 34, wherein the optimizing circuit is configured to maintain a source resistance as less than a series resistance.

39. The system as in claim 34, wherein the optimizing circuit comprises at least one of a first component configured to vary the inductance value of the inductor, a second component configured to vary the capacitance value of the capacitor, a variable resistor, or an FPGA.

40. The system as in claim 30, wherein the second optimization of the amount of power transmitted comprises maximizing the amount of power transmitted, provided that the power transfer efficiency is greater than or equal to a threshold efficiency.

41. The system as in claim 30, wherein the first optimization of power transfer efficiency comprises maximizing the power transfer efficiency, provided that the amount of power transmitted is greater than or equal to a threshold power amount.

42. An apparatus configured to receive wireless power comprising:
receive circuitry comprising:
an inductor having an inductance value;
a capacitor electrically connected to the inductor and having a capacitance value; and
terminal connections to a load, the receive circuitry being configured to optimize efficiency of power transfer from a transmitter according to rules that specify separately, information about both an efficiency level and an amount of power received by the receive circuitry.

43. The apparatus as in claim 42, wherein said receive circuitry is configured to optimize efficiency by maximizing efficiency of the power transfer, provided that the amount of power received is greater than or equal to a threshold power amount.

44. The apparatus as in claim 42, wherein said receive circuitry is further configured to at least one of maintain an impedance of the inductor substantially equal to a series resistance and maintain a resonance condition.

45. The apparatus as in claim 42, wherein the inductor comprises a variable inductor, wherein the capacitor comprises a variable capacitor, and wherein the receive circuitry further comprises at least one of a variable resistor or an FPGA.

46. The apparatus configured to receive wireless power comprising:
means for optimizing efficiency of power transfer from a transmitter according to rules that specify separately, information about an efficiency level and an amount of power received; and
means for electrically connecting the wireless power received to a load.

47. The apparatus of claim 46, wherein said means for optimizing efficiency comprises means for maximizing efficiency of the power transfer, provided that the amount of power received is greater than or equal to a threshold power amount.

48. The apparatus as in claim 46, further comprising at least one of means for maintaining a resistance of an inductor substantially equal to a series resistance or means for tuning a receive circuit to resonate in response to the wireless power.

49. A method for wireless power transfer, comprising:
optimizing power received from a transmitter at a receiver using a variable circuit component according to rules that specify separately, information about both an efficiency level of power transfer from the transmitter and an amount of power received by the receiver.

50. The method as in claim 49, wherein optimizing the power received comprises maximizing the amount of power received, provided that the efficiency level is greater than or equal to a threshold efficiency.

51. The method as in claim 49, further comprising at least one of maintaining a resistance of an inductor substantially equal to a series resistance or tuning the receiver to resonate in response to the power received.

52. An apparatus configured to receive wireless power, comprising:
means for optimizing power received from the transmitter according to rules that specify separately, information about both an efficiency level and an amount of power received; and
means for connecting the received power to a load.

53. The apparatus as in claim 52, wherein said means for optimizing comprises means for maximizing the amount of power received, provided that the efficiency level is greater than or equal to a threshold efficiency.

54. The apparatus as in claim 52, further comprising at least one of means for maintaining a resistance of an inductor substantially equal to a series resistance or means for tuning a receive circuit to resonant in response to the power received.

55. An apparatus configured to receive wireless power comprising:
receive circuitry comprising:
an inductor having an inductance value;
a capacitor electrically connected to the inductor and having a capacitance value; and terminal connections to a load, the receive circuitry being configured to optimize power received from a transmitter according to rules that specify separately, information about both an efficiency level and an amount of power received by the receive circuitry.

56. The apparatus as in claim 55, wherein said receive circuitry is configured to optimize the power received by maximizing the amount of power received, provided that the efficiency level is greater than or equal to a threshold efficiency.

57. The apparatus as in claim 55, wherein said receive circuitry is further configured to at least one of maintain an impedance of the inductor substantially equal to a series resistance or tune the receive circuitry to resonate in response to the power received.

58. The apparatus as in claim 55, wherein the inductor comprises a variable inductor, wherein the capacitor comprises a variable capacitor, and wherein the receive circuitry further comprises at least one of a variable resistor or an FPGA.

59. A system for wireless power transfer, comprising:
means for optimizing power transfer between a transmitter and a receiver by optimizing efficiency of the power received from the transmitter and by optimizing an amount of power received by the receiver; and
means for connecting the power received to a load.

60. The system as in claim 59, wherein optimizing efficiency and optimizing the amount of power are done according to rules that specify information about an efficiency level and the amount of power received.

61. The system as in claim 59, wherein optimizing the amount of power received comprises maximizing the power received, provided that the efficiency level is greater than or equal to a threshold efficiency.

62. The system as in claim 59, wherein optimizing efficiency comprises maximizing the efficiency of the power received, provided that the amount of power received is greater than or equal to a threshold power amount.

* * * * *